March 12, 1957  C. E. QUISENBERRY  2,784,605
DRIVE FOR WHEELED VEHICLES
Filed June 29, 1955  5 Sheets-Sheet 1

INVENTOR.
CARTER E. QUISENBERRY

BY *Tenner & Erstad*
ATTORNEY

March 12, 1957 C. E. QUISENBERRY 2,784,605
DRIVE FOR WHEELED VEHICLES
Filed June 29, 1955 5 Sheets-Sheet 3

INVENTOR.
CARTER E. QUISENBERRY

BY Tennes J Erstad
ATTORNEY

March 12, 1957  C. E. QUISENBERRY  2,784,605
DRIVE FOR WHEELED VEHICLES
Filed June 29, 1955  5 Sheets-Sheet 4

INVENTOR.
CARTER E. QUISENBERRY
BY Tenner & Ersted
ATTORNEY

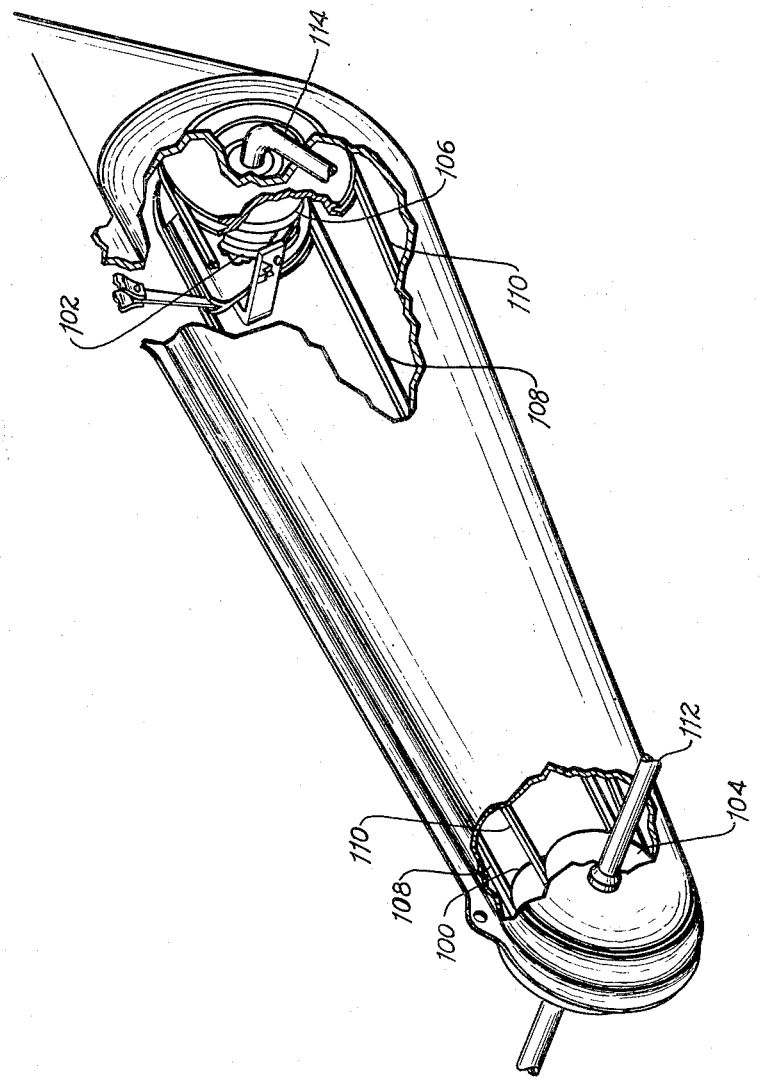

United States Patent Office 2,784,605
Patented Mar. 12, 1957

2,784,605

DRIVE FOR WHEELED VEHICLES

Carter E. Quisenberry, Kirkwood, N. Y., assignor to BMC Manufacturing Corp., a corporation of New York Application June 29, 1955, Serial No. 518,881

7 Claims. (Cl. 74—217)

This invention relates to apparatus for providing pedal operated wheeled vehicles with a multiple speed drive.

Heretofore, there have been various types of drives developed for wheeled vehicles but as far as known, they have all been of the single speed type so as to maintain the cost thereof within the bounds a consumer would expect to pay for such articles.

It is the object of this invention to provide an improvement for wheeled vehicles which will enable the child operating the wheeled vehicles to select one or more drives so that he can shift his vehicle into low speed in going uphill and shift into high speed when going along level ground and back into low speed if he so desires when descending a steep hill.

Another object of this invention is to provide a multiple speed drive for wheeled vehicles which will be of simple design and low in cost of manufacture and still be sufficiently rugged to withstand the normal use and abuse to be expected of children using wheeled vehicles.

A further object is to provide a shifting lever which will have a yieldable feel which will enable smooth shifting to be made from one speed to another.

A further object is to provide a free coasting or neutral position so that a child may, if he so desires, coast down hill and then shift into high gear while moving along the level ground and into lower speed when more power is required as when going up an incline or when pulling another vehicle or object.

Another object of this invention is to provide a multiple speed shift which can be employed with rotary type pedals such as those used in a tricycle or with pushing or reciprocating pedals such as are commonly employed in children's automobiles.

Another object is to provide a multiple speed drive for wheeled vehicles wherein the shifting lever will be located in the same place as conventional gear shift on a standard motor driven car is located.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Fig. 8 is an isometric view illustrating a multiple speed drive of the general type shown in Fig. 1 wherein belts and pulleys have been employed instead of chains and sprockets.

My invention is especially designed for use with children's wheeled vehicles and is particularly well suited for use with pedal operated wheeled vehicles. It may be used to drive bicycles and tricycles employing rotary pedal operated cranks as well as reciprocating push pedals such as are employed in children's automobiles.

Figure 1:
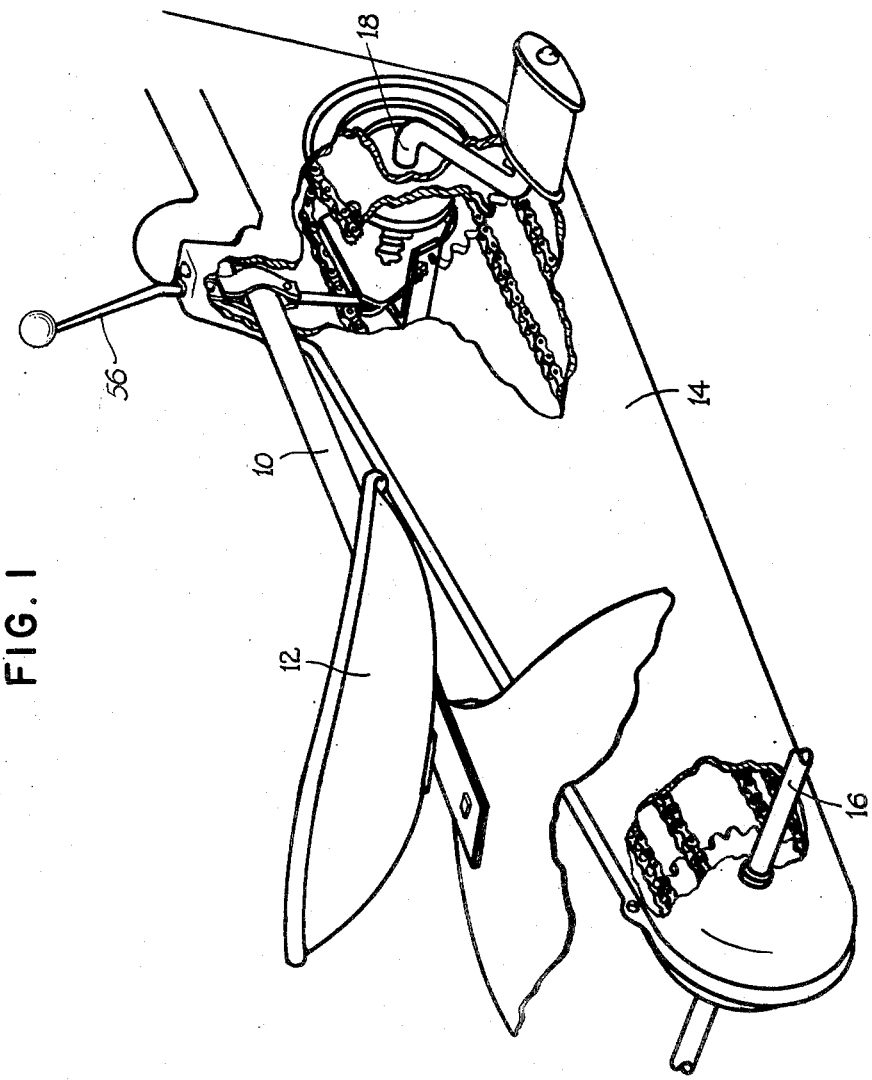
Fig. 1 is an isometric view illustrating a multiple speed chain drive with parts broken away to disclose the driving mechanism in the housing as applied to a rotary sprocket drive such as are commonly employed on children's tricycle type wheeled vehicles.

For purposes of illustrating the invention, I have shown in Fig. 1, a tractor type of wheeled vehicle wherein a suitable framework can be provided to which is secured a conventional seat 12 which may be of a design simulating seats such as employed on bicycles, tractors, motorcycles, etc. A drive housing 14 is secured at one end to the frame tube 10 and is mounted at the other end on the driving shaft 16 of the wheeled vehicle on which the drive is employed.

The pedal operated crankshaft 18 has a square drive block 20 pinned thereto. A drive collar 22 is slidably mounted on the square drive block 20. It will be appreciated that the drive block 20, instead of having a square configuration, could have a hexagonal or other configuration to which a driving collar is keyed.

Figure 3:
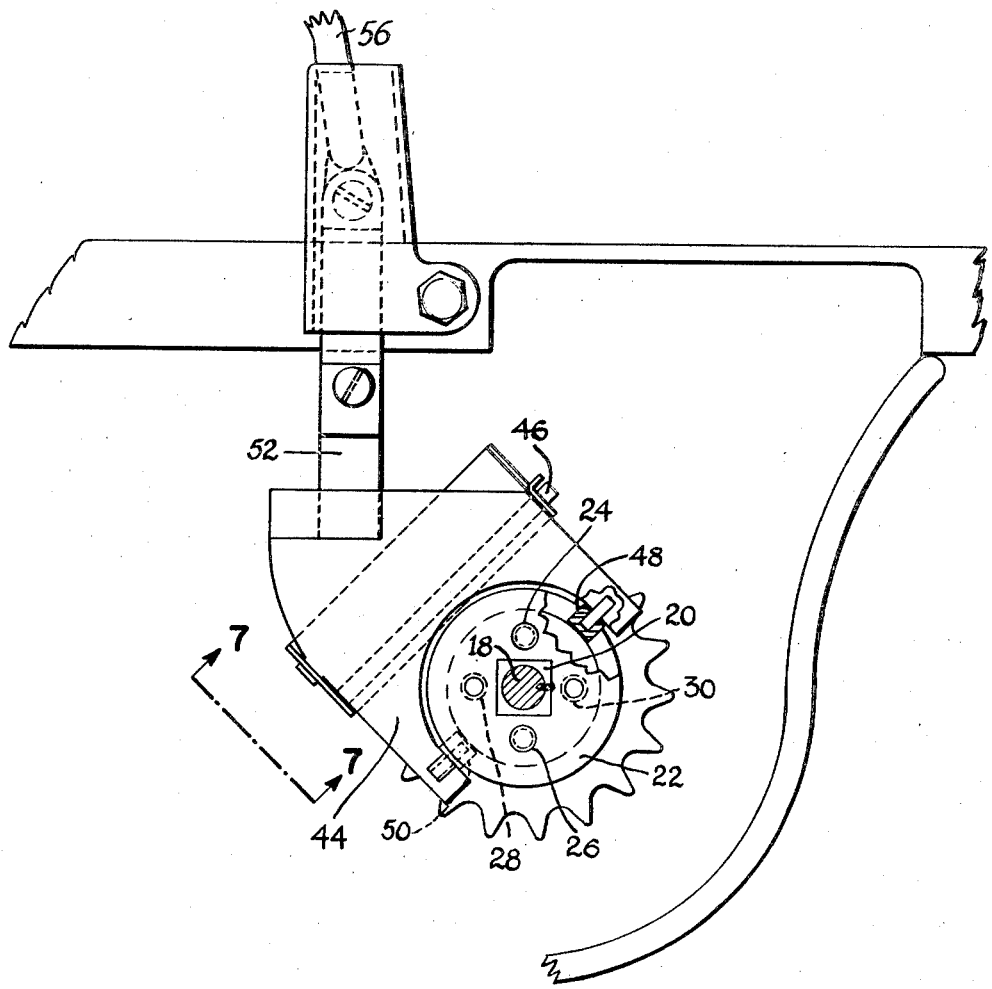
Fig. 3 is a side elevation, partly in section, of the two speed drive.
Figure 4:
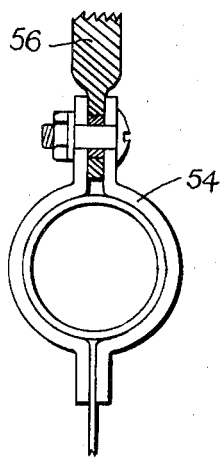
Fig. 4 is an end elevation, partly in section, of the selector linkage for actuating the clutch.
Figure 5:
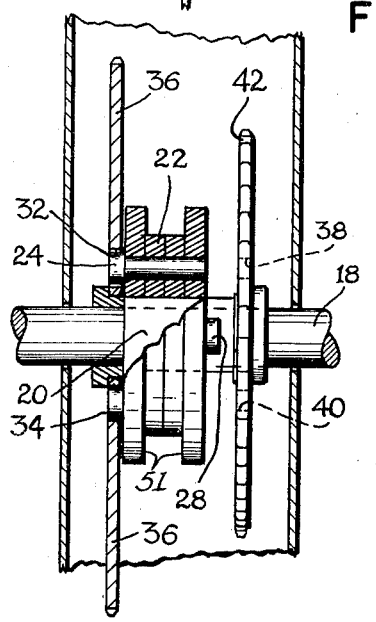
Fig. 5 is an end elevation, partly in section, of the driving and clutch mechanism.
Figure 7:
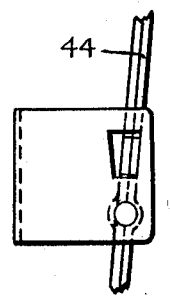
Fig. 7 is an end elevation of the clutch mechanism taken on line 7—7 of Fig. 3.

In the embodiment used to illustrate the invention, the driving collar is made from 4 laminations of cold rolled steel held together by 4 rivets as shown in Fig. 5. Two rivets are inserted from one side so that the rivet heads 24 and 26 project outwardly from the said side of the laminated drive collar 22. Two other rivets shown in Figs. 3 and 5 are inserted through the opposite side of said laminated collar so that the heads 28 and 30 thereof extend from the opposite side of the laminated collar 22. The rivet heads 24 and 26 are adapted to engage with matching holes 32 and 34 formed in the larger driving sprocket 36.

The other two rivet heads 28 and 30 are adapted to engage in similar matching holes 38 and 40 formed in the smaller sprocket 42. It will thus be apparent that the laminated driving collar 22 can be slid back and forth on the driving block 20 to bring the rivets 24 and 26 into engagement with the holes 32 and 34 of sprocket 36 or to bring the rivet heads 28 and 30 into engagement with the matching holes 38 and 40 of sprocket 42.

The laminated driving collar 22 is shifted back and forth on the driving block 20 by means of a shifting yoke 44. The shifting yoke is pivotally mounted on the shaft 46 which is fixedly secured to the drive housing 14 by suitable means such as spot welding. A pair of pins having rollers 48 and 50 extend from one end of the arm of the pivoted yoke 44 so that they ride in the U-shaped annular groove 51 formed in the laminated driving collar 22.

The pivoted yoke 44 is pivoted on the shaft 46 by means of a spring 52. Since the spring 52 is yieldable, it prevents breakage and gives a smooth shifting action. The spring 52 is sufficiently yieldable to urge the projecting rivet heads secured to the driving collar 22 up against the matching holes until such time that they slip into their respective driving sprocket holes. The spring 51 is pivotally mounted on the main frame or crossbar 10.

Figure 6:
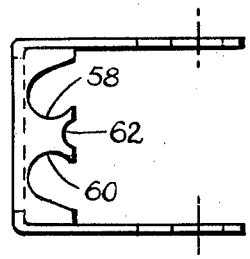
Fig. 6 is a plan view of the slots in the selector guide plate in which the clutch shifting lever is moved and locked.

The opposite end of the pivotal mounting 54 has a gear shifting lever 56 extending upwardly therefrom. The gear shifting lever 56 extends through a suitable lever locator and lock 58 and 60 shown in Fig. 6. When the gear shifting lever 56 is placed in the slot 58, it will cause the spring 52 to urge the yoke 44 to move in a direction which will push the heads 28 and 30 into the holes 38 and 40 of sprocket 42 thus driving the tricycle in low speed. If the gear shifting lever 56 is placed in the locator slot 60, it will cause the spring 52 to urge the drive collar in the opposite direction thus bringing the rivet heads 24 and 26 into engagement with the holes 32 and 34 formed in the sprocket 36 thus driving the vehicle in high speed.

It will be seen from the foregoing description that because of the yieldable spring mounting, a rider can shift his gear shifting lever 56 from high position to low position when he is driving his vehicle without actually causing the rivet heads to disengage from their respective holes in the driving sprocket that they happen to be in until the rider release his driving force. When this happens the spring 52 will automatically urge the yoke 44 into the opposite direction thus bringing the opposite rivet heads into engagement with the corresponding holes formed in the other driving sprocket.

The spring 52 then continues urging the rivet heads into engagement with such sprocket. If the gear shift lever 56 is placed in neutral position 62, neither of the pairs of the projecting rivet heads of the drive collar 22 will engage with any of their respective holes formed in the driving sprockets 36 and 42 and the vehicle would thus have a free coasting action and no exertion on the pedals would have any driving effect on the vehicle.

While I have shown the spaced pulleys mounted on the pedal driven drive shaft 18 as being sprockets 36 and 42, it will be appreciated that they could be of conventional V belt pulley design. As shown in Fig. 8, in this case, similar V belt pulleys 100, 102, 104 and 106 would be substituted for the sprockets fixedly mounted on the rear driven shaft 112 and the pedal driven shaft 114 of the wheeled vehicle and suitable V belts 108 and 110 would be trained over these pulleys 100, 102, 104 and 106 in place of the sprocket chains. Also, the different size pulleys or sprockets for providing a two speed drive can be mounted on either the pedal driven shaft 114 or on the driven shaft 112 of the wheeled vehicle.

Figure 2:
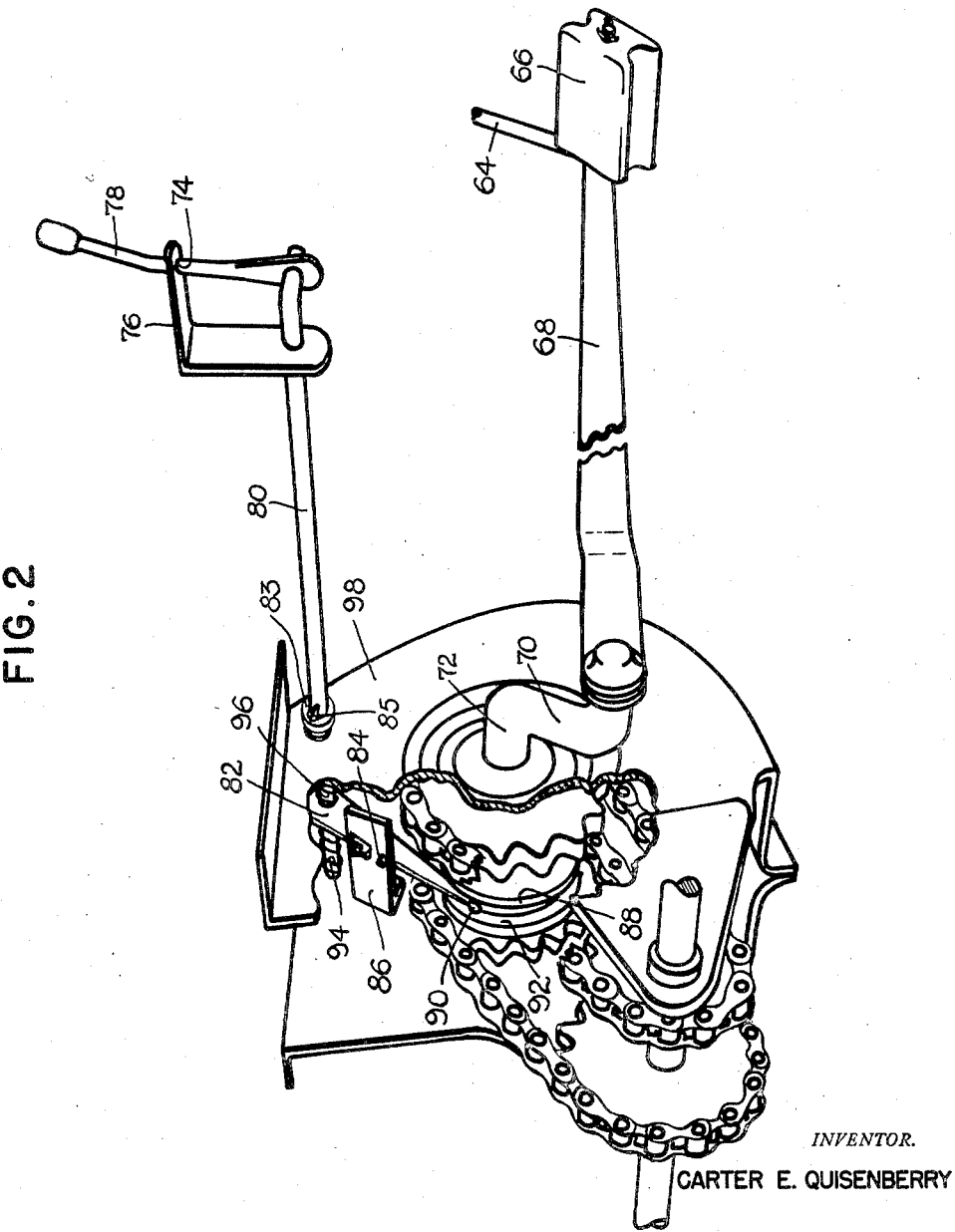
Fig. 2 is an isometric view illustrating a multiple speed chain drive with parts broken away to illustrate the driving mechanism as applied to wheeled vehicles employing push pedals similar to those used in toy automobiles.

The present driving mechanism is readily adaptable for use with various types of multi-wheeled vehicles which receive their propelling motion from either rotary driven pedals as shown in Fig. 1 or push pedals shown in Fig. 2. When a push pedal is employed as shown in Fig. 2, a link 64 is pivotally secured at one end to the vehicle and has a pedal 66 mounted at the lower end thereof. A connecting link 68 causes the crank arm 70 to rotate thus imparting rotary movement to the drive shaft 72 which corresponds to the drive shaft 18 shown in Fig. 1.

If desired, instead of mounting the gear shift lever at the center of the wheeled vehicle as shown in Fig. 1, it may be mounted to the side of the vehicle as shown in Fig. 2. In the embodiment shown in Fig. 2, the gear shift lever arm extends through a suitable opening 74 formed in a bracket 76 secured to the side of the vehicle and through a selector slot (not shown) similar to that illustrated in Fig. 6. The lower end of the gear shifting lever 78 is pivotally secured to a connecting link 80 which actuates a pivoted shifting lever 82. The pivoted shifting lever 82 is secured by means of a pivot 84 to a bracket 86 which is mounted over the conventional shifting collar 88 which is similar to the collar 22 of Fig. 3. The opposite end of the shifting lever 82 has an arm 90 which rides in the channel 92 of the shifting collar 88. This channel 92 corresponds to the channel 50 shown in Fig. 5.

Suitable springs 94 and 96 are mounted on the link 80 and extend inside of the crank case housing 98 and exert a yieldable force on the shifting lever 82 whenever the connecting link 80 is reciprocated in one direction or the other. The springs impart to the gear shift a smooth, easy shifting action which will not damage the clutch structure in case the rider endeavors to shift the vehicle when he is imparting driving force to the shaft 72.

All that would happen in such a case is that the connecting link 80 would be moved over to its desired position and either spring 94 or 96 would be compressed and would apply tension to the shifting lever 82. When the vehicle operator ceases to apply driving force to the shaft 72, the driving heads disengage with one sprocket or pulley in the manner heretofore described, and the shifting collar then slides on its driving shaft to bring the opposite rivet heads into engagement with their matching holes in the opposite sprocket or pulley as mentioned hereinabove.

It will be appreciated that while I have disclosed driving collars that are splined to a drive shaft, the collar could be stationary and have members projected therefrom which engage with either one or the other of the driving pulleys that are freely mounted on the pedal operated shaft, in accordance with the desires of the operator.

From the foregoing, it will be appreciated that the design is versatile and may be readily adapted to provide various styles of wheeled vehicle with a multiple shift which will have the feel of a very expensive drive mechanism and still will enable such vehicles to be produced at economical prices which the public expects to pay for such types of vehicles.

The invention herein above described may be varied in construction within the scope of the claims, for the particular device selected to illustrate the invention is but one of many possible embodiments of the same. The invention, therefore, is not to be restricted to the precise details of the structure shown and described.

What is claimed is:

1. A multiple speed drive for wheeled vehicles comprising a drive shaft, a pair of different diameter sprockets freely mounted on said drive shaft, a polygonal driving block mounted on and pinned to said drive shaft between said sprockets, a laminated drive collar slideably mounted on said driving block and having an internal bore with a configuration corresponding to the surface of said polygonal block, alternating rivets projecting through the laminations from opposite sides of said drive collar, the heads of said rivets alternately projecting from opposite sides of said laminated drive collar, said sprockets each having matching holes formed therein corresponding with the rivet heads projecting from one side of said drive collar, spring tensioned means for moving said drive collar into engagement with one or the other of said sprockets, sprockets fixedly mounted on a shaft driving the wheels of the wheeled vehicle, and sprocket chains interconnecting said sprockets mounted on said shaft driving said wheels with the sprockets freely mounted on said drive shaft.

2. A drive for wheeled vehicles comprising a pedal operated drive shaft, a square driving block fixedly mounted on said drive shaft, different diameter sprockets freely mounted on said pedal operated drive shaft, a laminated driving collar having a square hole mounted for sliding movement on said driving block relative to the axis of said pedal operated drive shaft, rivet heads projecting from said driving collar and engageable with matching holes formed in said freely mounted sprockets, and yieldable means engaging with said driving collar for sliding said collar along the driving block on said pedal operated drive shaft for controlling which of said projecting members are brought into engagement with the matching holes formed in said sprockets.

3. A multiple speed drive for wheeled vehicles comprising a pedal driven drive shaft, a polygonal driving block fixedly mounted on said shaft, a pair of sprockets of different diameters mounted for free rotary movement on said pedal driven shaft at a spaced distance from each other, a laminated central member slideably mounted on and driven by said driving block in between said sprockets, means on said central member for engaging and driving either of said sprockets, a shaft for driving the wheels of said wheeled vehicle, sprockets fixedly mounted to said shaft driving said wheels, sprocket chains interconnecting said fixed sprockets on the shaft driving said wheels to the freely mounted sprockets, and yieldable spring means for moving said central member into yieldable engagement with one or the other of said freely mounted sprockets to impart driving movement to said fixed sprockets.

4. A multiple speed drive for wheeled vehicles comprising a shaft for imparting driving movement to the wheels of said wheeled vehicle, sprockets fixedly mounted on said shaft, a pedal driven shaft mounted at a spaced distance from said vehicle driving shaft, sprockets having different diameters spaced from one another and mounted for free rotary movement on said pedal driven shaft, a sprocket chain interconnecting one of said fixed sprockets with one of said freely mounted sprockets, a second sprocket chain for connecting the other fixed sprocket with the other freely mounted sprocket, a central polygonal member fixedly mounted on said pedal driven shaft for receiving driving movement therefrom, a circular laminated member having a center bore slideably mounted on said central member and conforming to the configuration of said central member to be rotated thereby, said laminated member having at least one of the laminations of a smaller diameter than the other laminations to permit the ends of an actuating yoke to ride therein, rivets extending through said laminated member from opposite sides, the heads of said rivets projecting from the sides of said laminated member, said freely mounted sprockets having holes formed therein to receive said rivet heads, and yieldable means for actuating said yoke to bring the rivet heads on the sides of said laminated member into engagement with the holes of one or the other of said freely mounted sprockets to impart driving force thereto.

5. A multiple speed drive for pedal operated wheeled vehicles comprising a pedal driven shaft, different diameter pulleys mounted for free rotary movement on said pedal driven shaft at a spaced distance from each other, a second pair of pulleys fixedly mounted on a shaft driving the wheels of said wheeled vehicle, endless flexible elongated members interconnecting said fixed pulleys with said freely mounted pulleys to drive each in time with the other, a rectangular driving block fixedly mounted on said pedal driven shaft and receiving rotary movement therefrom, a laminated wheel having a square hole in the center thereof slideably mounted on said driving block, the center lamination of said wheel being of smaller diameter than the outside laminations to form a track, an actuating yoke riding on said track to control the sliding movement of said laminated wheel, rivets holding said laminations together, said rivets having heads extending from opposite sides of said laminated wheel, said freely mounted pulleys having holes arranged to receive said rivet heads to receive driving movement from said laminated wheel, and yieldable spring means for actuating said yoke to bring the rivet heads into engagement with one or the other of said freely mounted pulleys to impart rotary movement thereto to thereby enable said wheeled vehicle to be driven at different speeds.

6. A drive for a wheeled vehicle comprising a pedal operated drive shaft, different diameter pulleys freely mounted on said pedal operated drive shaft, a laminated wheel having a track formed by said laminations on the periphery thereof, rivets holding said laminations together, projections extending from opposite sides of said laminated wheel, holes formed in said pulleys into which said projections can be inserted to impart driving motion to said pulleys by means of the rotation of said laminated wheel, said laminated wheel being mounted to be slid back and forth on said pedal operated drive shaft in between said pulleys, spring tensioned track followers tracking on said track for sliding said laminated wheel back and forth on said pedal operated drive shaft to yieldably urge the projections of said laminated wheel into said holes of one or the other of said pulleys, an axle for driving said wheeled vehicle, pulleys fixedly mounted on said axle, endless flexible members interconnecting said fixed pulleys with said freely rotatable pulleys to impart driving movement to one of said fixed pulleys whenever the laminated wheel imparts driving movement to one of said freely rotatable pulleys.

7. A multiple speed drive for pedal operated wheeled vehicles comprising a shaft for imparting driving movement to the wheels of a wheeled vehicle, pulleys fixedly mounted on said wheeled vehicle shaft, a pedal driven shaft mounted at a spaced distance from said wheeled vehicle shaft, pulleys mounted for free rotary movement on said pedal driven shaft opposite to the fixed pulleys mounted on said wheeled vehicle shaft, endless flexible members interconnecting said fixed pulleys with said free pulleys, the diameters of either said fixed pulleys or said freely rotatable pulleys being different from one another so as to impart a different driving speed ratio to the driving wheels of said wheeled vehicle when said free pulleys are rotated, a square driving block fixedly mounted on said pedal driven shaft, a laminated wheel made from sheet metal having a square hole through the center thereof slideably mounted on said square driving block, some of said laminations being of a different diameter than the adjoining laminations to provide a track on the periphery of said laminated wheel, means formed on the sides of said laminated wheel and said freely mounted pulleys adapted for driving engagement with each other, and a yieldable spring actuated tracking member tracking on said track to move said laminated wheel into contact with either of said freely rotatable pulleys to drive either one or the other of said pulleys.

References Cited in the file of this patent
UNITED STATES PATENTS

| | | |
|---|---|---|
| 449,581 | Evans | Mar. 31, 1891 |
| 456,631 | Mosher | July 28, 1891 |